(12) United States Patent
Heatherington et al.

(10) Patent No.: US 6,318,775 B1
(45) Date of Patent: *Nov. 20, 2001

(54) COMPOSITE BUMPER CONSTRUCTION

(75) Inventors: David W. Heatherington, Spring Lake; James Lupone, Fruitport; Les Lewis, Grand Haven, all of MI (US)

(73) Assignee: Shape Corporation, Grand Haven, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/337,072

(22) Filed: Jun. 21, 1999

(51) Int. Cl.$^7$ .................................................. B60R 14/24
(52) U.S. Cl. ......................... 293/120; 293/132; 293/154
(58) Field of Search .................................. 293/120, 121, 293/130, 132, 133, 154, 155

(56) References Cited

U.S. PATENT DOCUMENTS

| | | | | |
|---|---|---|---|---|
| 4,328,986 | * | 5/1982 | Weller et al. ..................... | 293/122 X |
| 4,422,680 | | 12/1983 | Goupy . | |
| 4,488,745 | * | 12/1984 | Stokes .................................. | 293/155 |
| 4,573,274 | * | 3/1986 | Campen ................................. | 293/136 |
| 4,733,894 | * | 3/1988 | Lamparter ............................ | 293/120 |
| 5,005,887 | * | 4/1991 | Kelman ................................. | 293/120 |
| 5,114,198 | * | 5/1992 | Yamashita et al. ............... | 293/155 X |
| 5,306,058 | | 4/1994 | Sturrus et al. ........................ | 293/154 |
| 5,454,504 | | 10/1995 | Sturrus .................................... | 228/17 |
| 5,772,267 | * | 6/1998 | Heim et al. ....................... | 293/132 X |
| 5,803,517 | * | 9/1998 | Shibuya ................................ | 293/120 |
| 5,997,057 | | 12/1999 | Gasko et al. ......................... | 293/102 |
| 6,042,163 | * | 3/2000 | Reiffer .............................. | 296/154 X |

* cited by examiner

Primary Examiner—Joseph D. Pape
Assistant Examiner—Jason Morrow
(74) Attorney, Agent, or Firm—Price, Heneveld, Cooper & DeWitt & Litton

(57) ABSTRACT

A bumper construction for vehicles includes an elongated high-strength metal beam roll-formed from sheet steel, and at least one structural molded piece made of polymeric material attached to opposing end sections of the beam. Each structural piece has a rearwardly swept front surface that forms aerodynamically stylized corners at the ends of the beam. Each structural piece further provides attachment structure for attaching the beam to a vehicle, with the attachment structure being configured to transmit front impact forces compressively through the structural pieces to the vehicle frame, while minimizing the torsional and tensile forces on the attachment structure. The structural pieces further include a recess for closely receiving and supporting an impact-resisting flange on the beam to stabilize the beam during impact. The mateable engagement simplifies assembly, and further provides for high-energy absorption upon front impact of a vehicle.

37 Claims, 3 Drawing Sheets

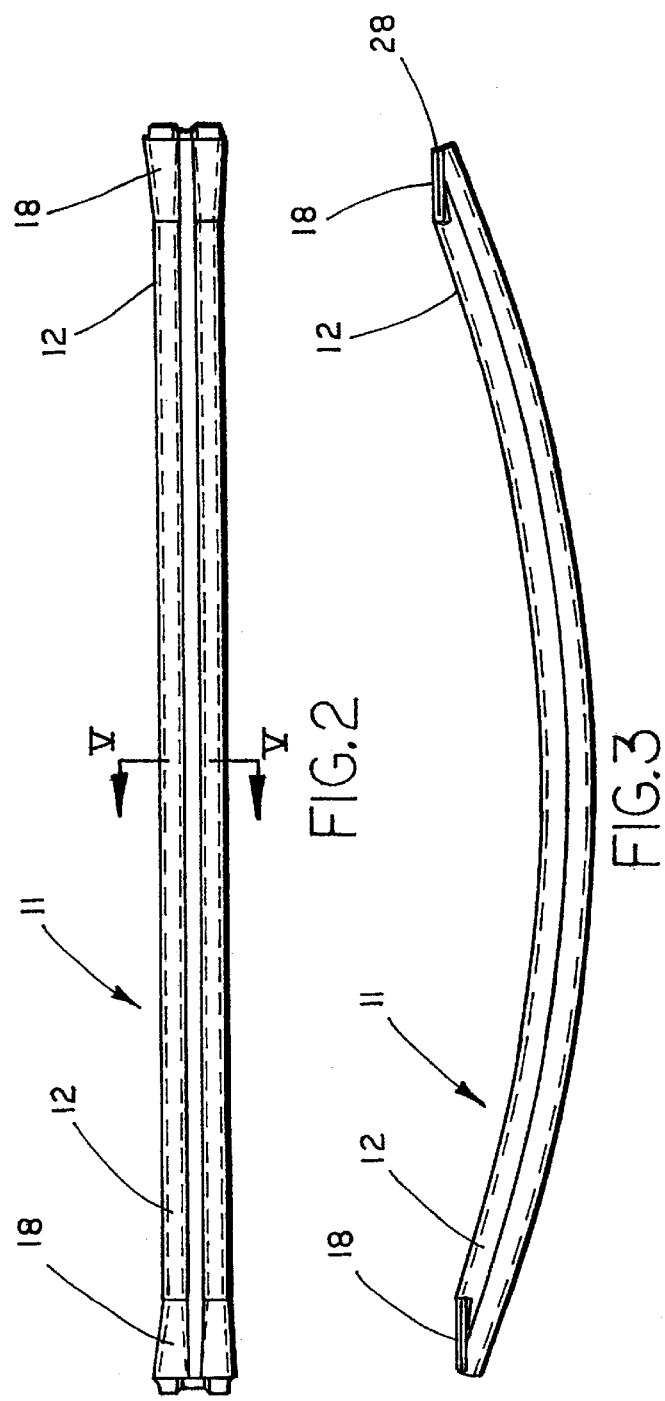

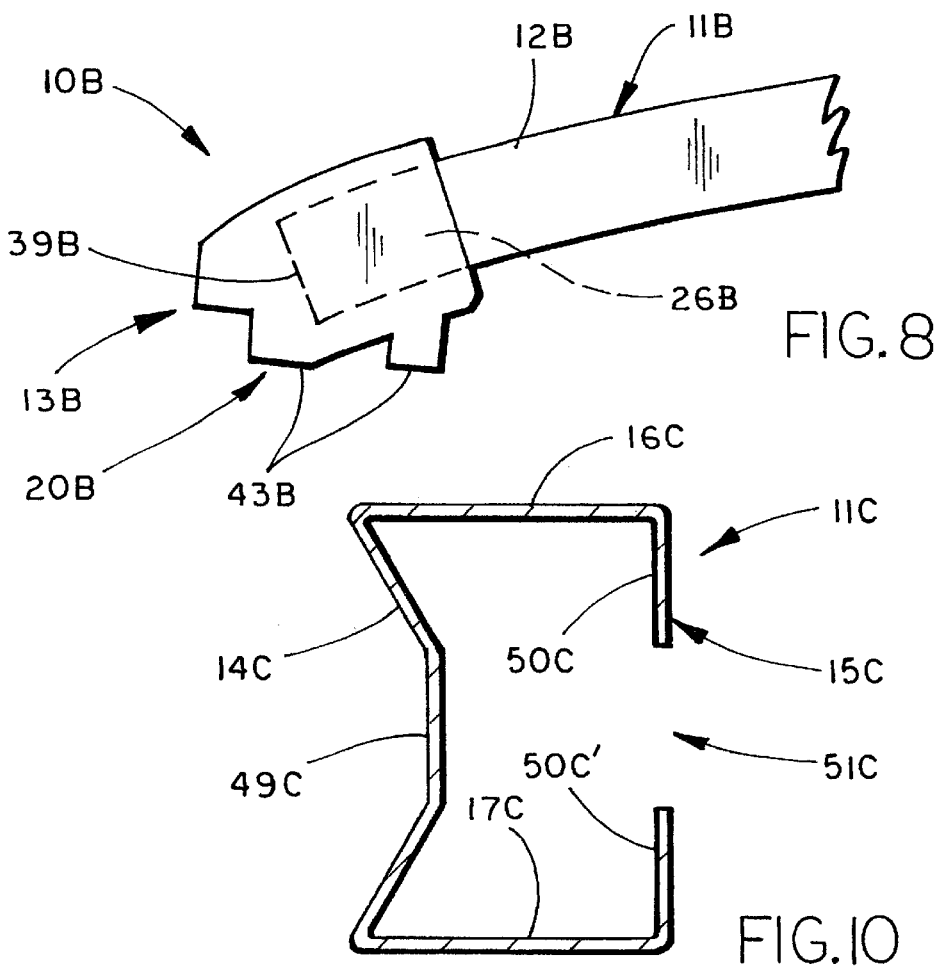
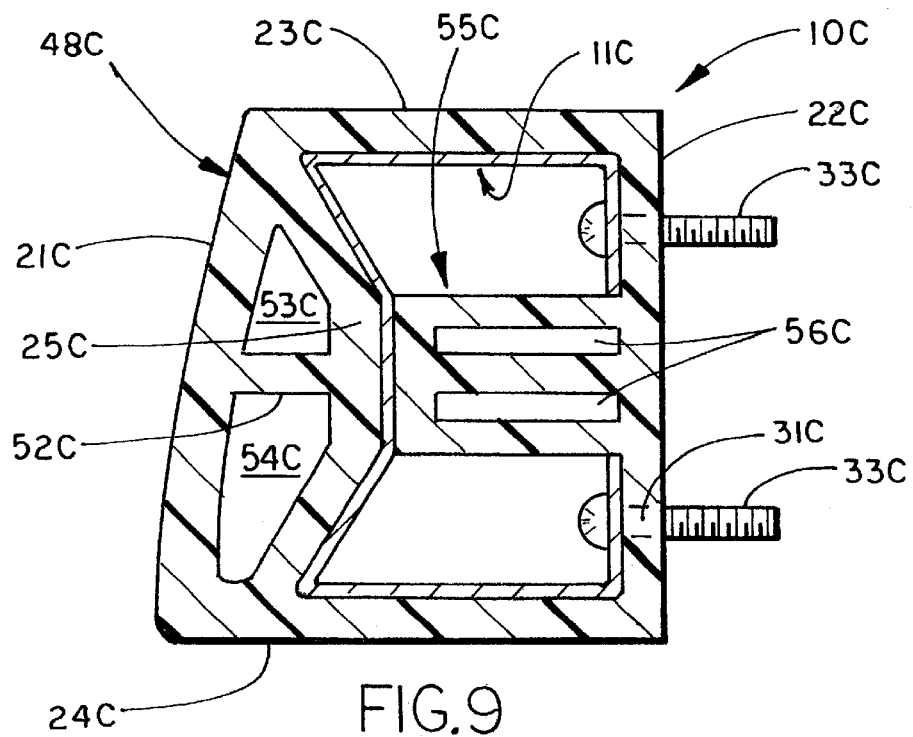

COMPOSITE BUMPER CONSTRUCTION

BACKGROUND OF THE PRESENT INVENTION

The present invention relates to a composite bumper system including a reinforcement beam with molded components that optimize energy absorption of the bumper system.

It is known to roll-form or stamp a high strength beam as an initial step in constructing a vehicle bumper. For example see U.S. Pat. Nos. 5,092,512 and 5,454,504. A problem is that, after roll forming, several additional secondary processes must be performed before the beam can be used as a vehicle bumper. For example, mounting bracketry must be attached to the beam to provide for attachment of the beam to a vehicle. The mounting bracketry is usually attached by a secondary process, such as welding, which requires significant investment in welding equipment and also requires close process control. Additional secondary processes and/or metal end attached parts are often used to shape ends of the bumper to meet design demands, such as to provide an aerodynamically styled bumper that sweeps at the front corners of the vehicle. However, these metal end-attached parts and end-forming processes are often expensive and add considerable cost to a bumper system. Sometimes, flexible plastic end caps are used to trim out ends of the bumper. However, flexible plastic end caps do not provide corner impact strength, but instead are designed to flex out of the way while other structure provides impact resistance. It is desirable to provide a mounting arrangement that simplifies or eliminates much of the secondary processing and that reduces the number and cost of the secondary processes, but that provides structure to ends of the bumper for corner impact strength and for styling. Another problem is that bumper beams must be made very strong to withstand the high impact forces generated in a vehicle crash. A bumper beam that collapses prematurely or inconsistently will not pass government tests. However, it is also undesirable to have a beam that is so stiff that it absorbs very little energy during impact, because the unabsorbed energy is transferred directly to the vehicle and results in damage to other vehicle components. Optimally, the beam should flex in a manner absorbing a maximum amount of energy over a given stroke during the impact, so that crash forces are optimally spread out over the bumper stroke during impact in a manner minimizing damage to the vehicle. Improvements are desired that utilize the flexibility and moldability of plastics, but in a way that does not make the bumper sensitive to premature or inconsistent failure due to a low impact strength and crack sensitivity of structural plastics or their sensitivity to cold (or hot) environments.

Accordingly, a bumper construction solving the aforementioned problems and having the aforementioned advantages is desired.

SUMMARY OF THE PRESENT INVENTION

We have conceived of mounting a beam, such as a roll-formed swept beam having a constant cross section, to a vehicle frame by using polymeric structural end pieces. The structural end pieces each optimally include one or more of the following features: 1) an inboard wall with a recess for mateably receiving an end of the beam to both hold and stabilize the beam; 2) a rear wall or stay forming an attachment structure for attachment to a vehicle frame mounting tower; 3) a front wall angled at an outer end to form a rearwardly angled, aerodynamically shaped front surface with the beam; and 4) an outer end constructed for optimal corner impact strength. The result are surprisingly and unexpectedly low cost bumper systems having excellent front and corner impact resistance properties, and yet that are easily assembled, require fewer pieces, are low cost to produce, are made using existing processes, and that require low capital investment, The systems further are flexible, such that they permit adjustments and customization to deal with specific problems, even late in a bumper development program.

We further have conceived of using structural molded pieces to stabilize key impact-resisting flanges of a metal bumper beam, thus leading to an improved bumper construction with increased energy-absorbing characteristics. Advantageously, the components of the bumper construction facilitate assembly by telescoping together or by being co-extruded or insert molded.

In one aspect of the present invention, a bumper construction for vehicles includes an elongated high strength beam having opposing end sections, and a pair of structural molded end pieces made of polymeric material attached to and supporting the opposing end sections. The end pieces include attachment structure constructed to securely mount the bumper construction to a vehicle frame.

In another aspect of the present invention, a bumper construction for vehicles includes an elongated beam having end sections with first front walls, and polymeric structural end pieces attached to the beam. The structural end pieces include second front walls forming a longitudinally extending extension of the first front walls. The structural end pieces further each include marginal material defining a recess for closely receiving an associated one of the end sections, with the marginal material stabilizing a cross-sectional shape of the associated one end section. The structural end pieces characteristically provide structure to the bumper construction to pass industry corner impact testing of vehicle bumpers.

In another aspect of the present invention, a bumper construction for vehicles includes an elongated reinforcement beam including a planar impact-resisting flange that extends generally in a horizontal direction when in a vehicle-mounted position. The horizontal direction is parallel a direction where high impact strength is desired. At least one structural molded member has a stabilizing wall extending parallel the impact-resisting flange. The stabilizing wall engages an outer surface of the impact-resisting flange to stabilize the stiffening flange so that the impact-resisting flange does not unstably bend and prematurely lose its impact-resisting strength upon a vehicle impact. The at least one structural molded member thus forms a high strength vehicle bumper construction with the beam that is capable of withstanding substantial impact forces generated when the bumper construction is impacted in a vehicle crash.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a schematic top view of a bumper system embodying the present invention, including a fascia broken away to show a bumper construction having a tubular swept beam and structural polymeric end pieces attached to the beam;

FIGS. 2 and 3 are rear and top views of the beam shown in FIG. 1;

FIG. 4 is a rear fragmentary perspective view of an end of the beam shown in FIG. 3;

FIGS. 6–8 are schematic top views of additional bumper constructions, each including modified beams and mating structural end pieces;

FIG. 9 is a cross section of another modified bumper construction, including another modified beam and mating structural end pieces; and FIG. 10 is a cross section of the modified beam shown in FIG. 9.

DETAILED DESCRIPTION OF PREFERRED EMBODIMENTS

Figure 5:
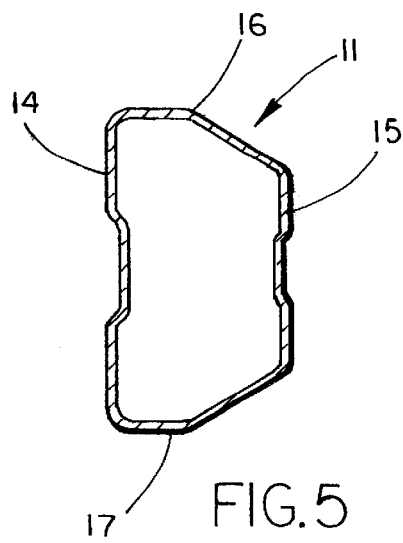
FIG. 5 is a cross section taken along the line V—V in FIG. 2.

A bumper system 8 (FIG. 1) embodying the present invention includes a fascia 9 that covers and is supported in part on a bumper construction 10. The bumper construction 10 includes an elongated high-strength beam 11 having opposing end sections 12, and a pair of molded structural end pieces 13 made of polymeric material that are attached to the opposing end sections 12. The illustrated end pieces 13 are configured to structurally engage ends of the beam 11 to stabilize a cross section of the beam 11, and further are configured to structurally attach and support the beam 11 on a vehicle frame. The end pieces 13 are particularly shaped to provide for quick assembly to ends of the beam 11 to reduce the cost of secondary assembly, but are constructed to support the beam 11 on a vehicle so that impact loads from a vehicle crash are transmitted from the beam primarily compressively through the end pieces to the vehicle frame. This allows the bumper construction 10 to pass government front-end impact tests for vehicles despite the structural and property limitations of molded materials, such as plastics. Also, the end pieces 13 stabilize a tubular shape of the beam 11, such that improved energy absorption occurs during front and corner bumper impacts. Still further, the end pieces 13 are particularly shaped to form aerodynamically stylized corners at ends of the beam 11.

Automotive fascia 9 (FIG. 1) and processes for manufacturing same are well known in the art, such that a detailed description of them and their processes does not need to be provided for an understanding of the present invention by a person skilled in this art. It is sufficient to note that the illustrated fascia can be made from reinforced reaction injection molded material and is color coated, such that it provides an aesthetic and aerodynamically styled front appearance to a vehicle.

Roll-formed beams, such as beam 11 shown in FIGS. 2–5, are also well known in the art. The illustrated beam 11 comprises a "D" shaped, roll-formed, swept tubular beam (see FIG. 5). It includes front, rear, top and bottom walls 14–17 (FIG. 5) forming a D-shaped cross section. For additional details of the illustrated beam 11, see U.S. Pat. No. 5,306,058 to Sturrus et al., issued Apr. 26, 1994, entitled *Tubular Roll-Formed Automotive Bumper*, the entire contents of which is incorporated in their entirety by reference. As shown in U.S. Pat. No. 5,306,058, it is known to form coplanar flat mounting areas 18 (FIGS. 2–4) on a back of ends of the beam, such as by using a mechanical compression forming process that "crushes" and reforms an end of the roll-formed beam.

The illustrated beam in U.S. Pat. No. 5,306,058 is D-shaped, but it is contemplated that many other beam shapes can be used in the present invention. For example, U.S. Pat. No. 5,454,504 discloses a "B" shaped, tubular roll-formed beam that could be used. Also, other tubular shapes are possible, such as a hybrid bumper having a B-shaped cross section where a recessed center section of the front wall extends toward, but does not abut a rear wall of the cross section. It is also contemplated that the scope of the present invention also includes non-tubular cross-sectional shapes, such as "C," "NM," "X," and the like, as discussed below.

Figure 6:
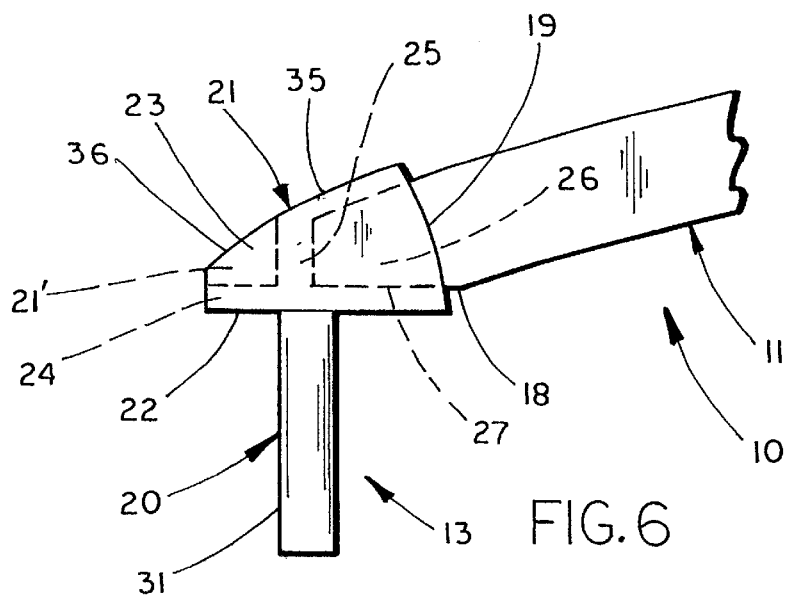

The end piece 13 (FIG. 6) is a molded component with front, rear, top, bottom, and intermediate walls 21–25 that form an inboard face 19 and that define an inwardly facing recess 26. The recess 26 is shaped to mateably closely receive the end section 12, with marginal material of the walls 21–25 engaging outer surfaces of the beam 11 on all four sides. The illustrated recess 26 is concavely shaped and defines a relatively thin slit 27 that receives the projecting doubled flanges 28 (FIG. 4) on the end sections 12 of the beam 11. The overall shape of the recess 26 closely matches a cross-sectional shape of the end of the beam 11 when the end section 12 is fully seated into the recess 26. The close engagement results in the walls 21–25 supporting and stabilizing the walls 14–17 during impact. Stabilization of the top and bottom walls 16 and 17 is particularly important to obtain consistent and good impact resistance, since premature or unexpected collapse of the top and bottom walls in any location (e.g., at the mounting area) can lead to impact test failure and/or inconsistent impact test results. Notably, the tubular shape of beam 11 allows the walls 14–17 to be stabilized by engagement with their outer surfaces alone, but it is contemplated that a projection can be extended into the end of the beam 11, if desired, for additional stabilization.

The rear wall 22 (FIG. 6) includes an attachment structure 20 on the end piece 13 for securing the end piece 13 to a vehicle frame. The attachment structure 20 includes a stay 31 extending from the flat rear wall 22 that is configured to engage mating structure on a vehicle frame, such as a bumper mount or tower. Apertures are formed in one or both of the flat rear wall 22 and/or stay 31 for receiving fasteners to secure the end piece 13 to the vehicle frame. The flat rear wall 22 overlappingly extends under and engages the flat mounting area 18 of the beam 11. This arrangement results in a sandwich-like advantageous arrangement where impact forces are transmitted primarily compressively through the polymeric material of the end piece 13, with the torsional and tensile forces on the end piece 13 being minimized or spread out. It is contemplated that the end piece 13 can be constructed to allow some movement of the beam 11 relative to the end pieces 13, thus further minimizing any non-compressive forces on the end piece 13. The enlarged flat surface of the flat mounting areas 18 and 22 not only distribute the impact forces over a wide region, but also provides an enlarged bearing area that reduces undesirable wear when the beam 11 shifts and moves relative to the end piece 13.

It is contemplated that the end section 12 can be secured in the recess 26 in different ways. Several alternative attachment means are possible, such as friction fit, adhesive, snap-attachment hooks that engage apertures or other features in the beam 11, and the like. Notably, once the bumper construction 10 is attached to both sides of a vehicle, the end pieces 13 trap the beam 11 therebetween and retain it to the vehicle, regardless of whether the beam 11 is directly physically attached to each end pieces 13 or not. Notably, the fascia 9 also can help provide retention of the bumper construction 10 to the vehicle by capturing the end pieces 13 on the beam 11.

It is contemplated that different materials can be used to make the end pieces 13. The choice of materials is highly dependent upon the functional and structural requirements of the bumper system 8. One desirable feature of the present construction is that the material of end piece 13 can be modified late in a bumper development program to achieve optimal impact properties. For example, structural polymeric materials such as polypropylene (reinforced and/or unreinforced) can be used to make a molded end piece 13. The material properties can be optimized by varying the amount of reinforcement in the plastic or by molding a different plastic. This can be done without the long lead time required for sheet metal products for bumper brackets and beams. It is also contemplated that other materials, such as polyesters, acetals, polycarbonates, ABS, and the like can be used. It is further envisioned that the end pieces 13 can be made from two different materials, with one being insert molded, cast, or attached to the other. For example, the rear wall 22 and adjacent walls could be molded of a first material, such as glass reinforced polyester having high-strength properties sufficient for screw attachment and long term durability without creep or stress-fracture, while the front walls 21 would be molded of a polypropylene or other material often used for bumper-attached, "honeycomb" shaped energy absorbers, where the material has substantial flexibility and excellent energy absorbing characteristics and rebound/memory. Notably, the outer end of end piece 13 has a recess 21 forming a honeycomb-shaped energy-absorbing section on end piece 13.

The front wall 21 of the end piece 13 (FIG. 6) has a first section 35 that extends along a curvature generally parallel the front wall 14 of beam 11. However, an outer second section 36 of the front wall 18 angles rearwardly to provide an aerodynamic shape highly suited for modern vehicles at their front corners in front of the vehicle wheel fenders. It is noted, however, that the present bumper construction 10 is also well suited for use in rear bumper applications as well.

The present disclosure includes additional embodiments, with elements and features that are the same or similar, being identified with the same identification numbers, but with the addition of the letters "A," "B," etc. This is done to eliminate redundant discussion and to make the discussion clear regarding different embodiments.

Figure 7:
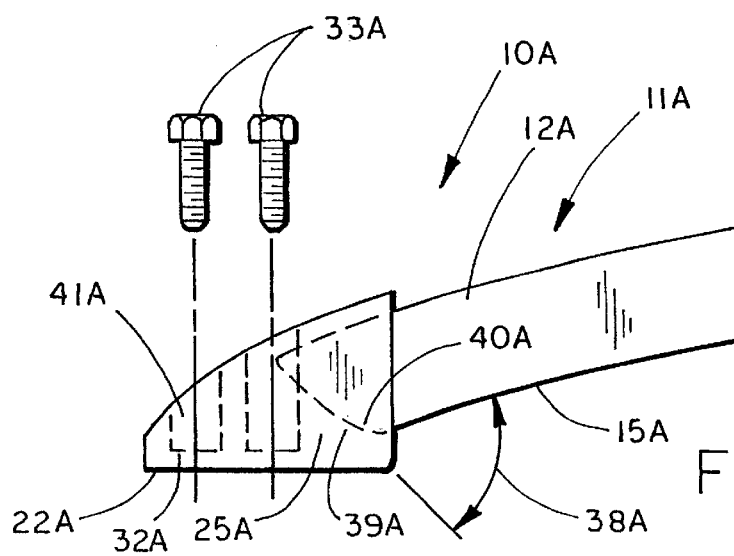

Bumper construction 10A (FIG. 7) includes a beam 11A having its end section 12A cut at an obtuse angle 38A to form an angled end surface 39A. The illustrated angle 38A is about 60 degrees from being perpendicular to a longitudinal centerline of the beam 11A. The recess 26A in structural end piece 13A is similarly mateably shaped to receive the end section 12A and to engage the angled end surface 39A. It is noted that the angled end surface 39A does not need to be planar and, in fact, there are advantages to rounding the area 40A on the top and bottom walls in the rear area 40A so that the rounded rear area 40A acts as a pivot when the beam 11A undergoes a severe impact and temporarily flexes toward a straightened condition. Notably, on 5-mph impacts, the angled end surface 39A engages the mating surface in recess 26A to provide support to the beam 11A. If the beam 11A is impacted with sufficient force to cause it to flex toward a straightened position or if the beam 11A is impacted on its front surface at an angle to the front surface, the angled end surface 39A extends toward the end piece 13A, thus providing an arrangement that results in primarily compressive forces on the end piece 13A. It is contemplated that a flap (not shown) can be formed from rear wall 15A and welded across all or part of the open end of the beam 11 to provide increased surface area for the intermediate wall 25A of end piece 13 to engage, such as at rounded area 40A.

The end piece 13A is further modified in that the flat mounting area of rear wall 22A forms an apertured plane that defines the attachment structure 20A, and there is no stay 31. The flat rear wall 22A is constructed to abut a mating flat area on a mounting tower or other vehicle attachment structure. Holes 32A are located in the flat rear wall 22A, and open holes 41A are provided in the body of the end piece 13A so that fasteners, such as bolts 33A, can be extended through the end piece 13A into the holes 32A.

The bumper construction 10B (FIG. 8) includes a beam 11B having an end section 12B that is neither deformed nor cut at an angle. The illustrated beam 11B has an end 39B cut perpendicularly to the longitudinal centerline of the beam 11B. The recess 26B in structural end piece 13B is mateably shaped to receive the end section 12B and to engage the perpendicular end surface 39B. In the illustrated end piece 13B, the attachment structure 20B and the recess 26B are shaped to accommodate the end section 26B. Specifically, the attachment structure 20B includes protrusions 43B that serve as locators to engage the vehicle bumper mounting structure, and further include holes for receiving attachment screws for securement to a vehicle frame. Notably, on 5-mph impacts, the end surface 39B and the rear wall 15B of the beam 11B engage the mating surface in recess 26B to provide support to the beam 11B, thus providing an arrangement that results in primarily compressive forces on the end piece 13B.

The bumper construction 10C (FIG. 9) includes an "M" shaped beam 11C and a polymeric extrusion 48C that extends a full length of the beam 11C. As illustrated, the extrusion 48C has a cross section that extends fully around the cross section of the beam 11C, encapsulating the beam 11C. Notably, the extrusion 48C has a shape reminiscent of the inboard face 19 of structural end piece 13 discussed above. In fact, it is contemplated that short sections of the polymeric extrusion 48C can be used to form opposing end sections 13C if desired, with the fasteners 33C securing the short sections to the beam 11C.

The beam 11C includes a front wall 14C having a center section 49C that is recessed rearwardly, planar top and bottom walls 16C and 17C, and a pair of coplanar flanges 50C and 50C' forming a rear wall 15C that is split in half by an opening 51C. The polymeric extrusion 48C includes a front wall 21C and an intermediate wall 25C connected by a support wall 52C with top and bottom voids 53C and 54C. The arrangement of walls 21C, 25C, and 52C along with voids 53C and 54C provide an integral energy-absorbing system that is important to the energy-absorbing characteristics of the arrangement depending on the bumper design, since it potentially eliminates the need for a secondary energy absorber to be mounted on a front of the bumper construction 10C. The extrusion 48C further includes top and bottom walls 23C and 24C that lie flat against and stabilize the top and bottom walls 16C and 17C of the beam 11C. Also the extrusion 48C includes a rear wall 22C that lies flat against the coplanar rear flanges 50C and 51C. A protrusion 55C extends from the rear wall 22C through the opening 51C into abutment with the recessed center section 49C of the front wall 14C. The protrusion 55C is wide enough to engage and stabilize ends of the rear flanges 50C and 51C. The protrusion 55C includes voids 56C that facilitate the molding process, and further cause the protrusion to have improved impact-absorbing characteristics. An internal cavity defined within the extrusion 51C defines a shape that mateably closely engages the outer surface of the beam 11C. The internal cavity allows the extrusion 51C to engage and stabilize all sides of the beam 11C, so that the extrusion 48C controls buckling and twisting of the beam 11C. Thus, the illustrated arrangement of beam 11C and extrusion 48C provides a low cost, but very strong and consistently manufacturable bumper construction 10C. Holes 31C are located in the rear wall 22C and aligned holes are provided in the coplanar flanges 50C and 50C', for providing attachment structure for securing the bumper construction 10C to a vehicle frame. This further stabilizes the flanges 50C and 50C'. It is contemplated that access holes can be provided in the front and intermediate walls 21C and 25C to install the fasteners 36C. Alternatively, nuts (not shown) can be welded to the flanges 50C and 50C' and screws can be turned in from a rear side of the bumper. The beam 11C and the extrusion 48C can be linear or can be swept along a curvilinear arc. It is contemplated that the extrusion 48C can be co-extruded onto the beam 11C at an end of the roll-forming process, or can be co-extruded onto the beam 11C in a separate process. It is also contemplated that the extrusion 48C can be telescopingly slid onto the beam 11C (or the beam 11C can be slid into the extrusion 48C) to assemble the two components.

The present construction reduces the long development period of bumper systems because the structural end pieces can be quickly modified and/or the material optimized to provide optimal energy absorption by the bumper system. Specifically, material substitution is easily made in the end pieces and can be made late in the vehicle design without wasting material or requiring major vehicle structural changes. Wall sections of the structural end pieces can be changed, added, or deleted for more or less energy absorption, and to create a more consistent energy absorption. Further, secondary processes can be simplified. Also, corrosion problems in bumpers are substantially eliminated.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A bumper construction for vehicles comprising:
an elongated beam having opposing end sections; and
a pair of structural molded end pieces made of polymeric material, the end pieces being attached to and supporting the opposing end sections and including attachment structure constructed to securely mount the bumper construction to a vehicle frame;
wherein each of the end pieces include a cross section that encapsulates the beam.

2. The bumper construction defined in claim 1, wherein the attachment structure provides the only structural attachment of the bumper construction to a vehicle.

3. The bumper construction defined in claim 2, wherein the beam is tubular.

4. The bumper construction defined in claim 3, wherein the beam comprises a sheet formed into a tubular shape and welded permanently in the tubular shape.

5. The bumper construction defined in claim 4, wherein the beam is swept into a curvilinear longitudinal shape.

6. The bumper construction defined in claim 1, wherein the beam includes a front surface, and wherein the end pieces each include a front wall forming a continuation of the front surface that extends longitudinally from the end sections of the beam.

7. The bumper construction defined in claim 1, wherein the attachment structure forms a stay configured for attachment to a vehicle.

8. The bumper construction defined in claim 1, wherein the attachment structure includes a flat rear wall having first holes, and wherein the beam includes second holes that align with the first holes when the beam is attached to the end pieces, and including fasteners that extend through the first and second holes for mounting the bumper construction to a vehicle frame.

9. The bumper construction defined in claim 1, wherein the end sections of the beam overlap the attachment structure so that, upon impact, the end sections transmit compressive forces through the attachment structure while minimizing torsional and tensile forces on the end pieces.

10. The bumper construction defined in claim 9, wherein each of the end sections of the beam includes first rear walls that have flattened sections that are coplanar with each other, and wherein each of the end pieces includes second rear walls that engage the first rear walls.

11. The bumper construction defined in claim 1, wherein the beam is longitudinally curved and wherein the end pieces include recesses that mateably telescopingly receive the end sections of the beam, but that are constructed to permit the beam to flex toward a straightened shape while pivoting on the end pieces.

12. The bumper construction defined in claim 1, wherein the beam includes planar parallel top and bottom walls, and wherein the end pieces include recesses that mateably telescopingly closely receive the end sections of the beam, the end pieces stabilizing the top and bottom walls upon impact so that the top and bottom walls do not spread upon impact, thus providing an improved impact strength to the bumper construction.

13. The bumper construction defined in claim 12, wherein the recess includes a groove for closely receiving the top and bottom walls of the beam.

14. The bumper construction defined in claim 1, including a molded fascia supported on the beam and end pieces.

15. A bumper construction for vehicles comprising:
an elongated beam having end sections with first front walls; and
polymeric structural end pieces attached to the beam that include second front walls forming a longitudinally extending extension of the first front walls, the structural end pieces each including marginal material defining a recess for closely receiving an associated one of the end sections with the marginal material stabilizing a cross-sectional shape of the associated one end section;
wherein the beam includes vehicle attachment structure that provides the only structural attachment of the bumper construction to a vehicle.

16. The bumper construction defined in claim 15, wherein the attachment structure forms a stay configured for attachment to a vehicle.

17. The bumper construction defined in claim 15, wherein the attachment structure includes first holes, and wherein the beam includes second holes that align with the first holes, and including screws configured to extend through the first and second holes for mounting the bumper construction to a vehicle frame.

18. The bumper construction defined in claim 15, wherein the end sections of the beam overlap the attachment structure so that, upon impact, the end sections transmit compressive forces through the attachment structure while minimizing torsional and tensile forces on the end pieces.

19. A bumper construction for vehicles comprising:
an elongated reinforcement beam including a planar impact-resisting flange that extends generally in a horizontal direction when in a vehicle-mounted position, the horizontal direction being parallel a direction where high impact strength of the beam is desired; and at least one structural molded member having a stabilizing wall extending parallel the impact-resisting flange, the stabilizing wall engaging an outer surface of the impact-resisting flange to stabilize the impact-resisting flange so that the impact-resisting flange does not unstably bend and prematurely lose its impact-resisting strength upon a vehicle impact, the at least one structural molded member thus forming a high-strength vehicle bumper construction with the beam that is capable of withstanding substantial impact forces generated when the bumper construction is impacted in a vehicle crash;

wherein the molded member includes a cross section that encapsulates the beam.

20. The bumper construction defined in claim 19, including a second impact-resisting flange on the beam, and including a second stabilizing wall on the at least one structural molded member stabilizing the second impact-resisting flange.

21. The bumper construction defined in claim 20, wherein the first-mentioned and second impact-resisting flanges are top and bottom flanges on the beam when in the vehicle-mounted position.

22. The bumper construction defined in claim 21, wherein the beam includes an intermediate wall connecting the top and bottom flanges.

23. The bumper construction defined in claim 22, wherein the at least one structural molded member includes a recess formed in part by the first and second stabilizing walls.

24. The bumper construction defined in claim 23, wherein marginal material forming the recess includes center material that engages and stabilizes the intermediate wall to stabilize the intermediate wall during impact.

25. The bumper construction defined in claim 24, wherein at least one of the first and second stabilizing walls and the center material frictionally engages the impact-resisting flange during attachment of the molded member to the vehicle.

26. The bumper construction defined in claim 19, wherein the molded member includes retaining structure configured to snap attach to the beam upon assembly thereto.

27. The bumper construction defined in claim 19, wherein the beam has an M-shaped cross section with top and bottom parallel legs, one of the parallel legs being the impact-resisting flange.

28. The bumper construction defined in claim 27, wherein the molded member includes a front wall that covers a front surface of the beam and forms an integral energy absorber on the beam.

29. The bumper construction defined in claim 19, wherein the molded member includes attachment flanges with holes for receiving vehicle attachment screws, and further includes recesses deep enough and wide enough to receive the attachment screws.

30. The bumper construction defined in claim 19, wherein the beam is symmetrical from top to bottom, but wherein the molded member is non-symmetrical from top to bottom.

31. The bumper construction defined in claim 19, wherein the beam has an M-shaped cross section with one leg of the M-shaped cross section forming the impact-resisting flange, and wherein the molded member has a closed cross section with a recess therein shaped to mateably receive the M-shaped cross section from an end of the molded member.

32. A bumper construction for vehicles comprising:

an elongated reinforcement beam including a planar impact-resisting flange that extends generally in a horizontal direction when in a vehicle-mounted position, the horizontal direction being parallel a direction where high impact strength of the beam is desired; and at least one structural molded member having a stabilizing wall extending parallel the impact-resisting flange, the stabilizing wall engaging an outer surface of the impact-resisting flange to stabilize the impact-resisting flange so that the impact-resisting flange does not unstably bend and prematurely lose its impact-resisting strength upon a vehicle impact, the at least one structural molded member thus forming a high-strength vehicle bumper construction with the beam that is capable of withstanding substantial impact forces generated when the bumper construction is impacted in a vehicle crash.

33. The bumper construction defined in claim 32, including a second impact-resisting flange on the beam, and including a second stabilizing wall on the at least one structural molded member stabilizing the second impact-resisting flange.

34. The bumper construction defined in claim 33, wherein the first-mentioned and second impact-resisting flanges are top and bottom flanges on the beam when in the vehicle-mounted position.

35. A bumper construction for vehicles comprising:

an elongated beam having opposing end sections; and a pair of structural molded end pieces made of polymeric material, the end pieces being attached to and supporting the opposing end sections and including attachment structure constructed to securely mount the bumper construction to a vehicle frame;

wherein the beam includes planar parallel top and bottom walls, and wherein the end pieces include recesses that mateably telescopingly closely receive the end sections of the beam, the end pieces stabilizing the top and bottom walls upon impact so that the top and bottom walls do not spread upon impact, thus providing an improved impact strength to the bumper construction.

36. The bumper construction defined in claim 35, wherein the recess includes a groove for closely receiving the top and bottom walls of the beam.

37. A bumper construction, comprising:

an elongated beam having end sections with first front walls; and polymeric structural end pieces attached to the beam that include second front walls forming a longitudinally extending extension of the first front walls, the structural end pieces each including marginal material defining a recess for closely receiving an associated one of the end sections with the marginal material stabilizing a cross-sectional shape of the associated one end section;

wherein each of the end pieces include a cross section that encapsulates the beam.

* * * * *